Patented Dec. 18, 1934

1,984,671

UNITED STATES PATENT OFFICE 1,984,671

SPLINTERLESS MATERIAL, PARTICULARLY SPLINTERLESS GLASS

Karl Daimler and Gerhard Balle, Frankfort-on-the-Main-Hochst, Germany, assignors to I. G. Farbenindustrie Aktiengesellschaft, Frankfort-on-the-Main, Germany No Drawing. Application April 9, 1931, Serial No. 528,975. In Germany April 19, 1930

5 Claims. (Cl. 49—81)

The present invention relates to non-splintering materials, particularly safety glass.

Non-splintering glass, so-called safety-glass is generally made by using sheets of celluloid or solutions of cellulose ester and the like as an adhesive layer between two plates of glass. The material thus prepared has, however, various drawbacks; it gradually becomes yellow and is altered by the formation of bubbles, whereby its practical value is diminished.

We have now found that non-splintering glass can be made by directly uniting two or more sheets of glass by means of adhesive to gummous reaction products obtainable by a more or less advanced reaction between maleic acid or maleic anhydride on the one hand and 1.3-glycols or the corresponding 2.3 unsaturated mono-alcohols on the other hand. 1.3-glycols, if subjected to the action of maleic acid or maleic anhydride, are probably converted into the corresponding 2.3 unsaturated mono-alcohols, by splitting off water, and it follows therefrom that one can also start from the corresponding 2.3 unsaturated mono-alcohols.

The condensation products obtainable from all these compounds can be produced according to the kind and duration of the condensation in three different phases: in a resinous or oily first stage, the products still being soluble in organic solvents, in a still soluble, but no longer completely fusible intermediate stage of the condensation and in an insoluble and infusible final stage.

For the purpose in question they possess particularly favorable properties inasmuch as in most cases they are completely colorless and fast to light. For the manufacture of safety glass it may be convenient to use the said condensation products in the so-called first stage of the condensation in which they constitute either viscous oils or at a raised temperature readily fusible resinous substances. In this condition they are for instance spread in a uniform thin layer upon a glass plate and a second plate is superposed, while avoiding the formation of bubbles. The plates are then united homogeneously, if required by the application of pressure.

In most cases the adhesiveness and the safety to splintering of a safety glass thus prepared will be sufficient. In particular cases the condensation may be continued by a further heating operation so as to attain the intermediate stage of the condensation or its final stage, the application of pressure being advantageous in these cases. The subsequent condensation and likewise the primary condensation may be effected from the very beginning in such a manner that the ester resins are further condensed alone; but the reaction may likewise be carried out in the presence of a suitable filling material; particularly in the presence of cellulose derivatives and other compounds of high molecular weight, such as polyvinyl compounds, for instance, polystyrene, polyvinyl ester, polyacrylic acid ester and the like. There may, for instance, be used a mixed product consisting of 30 parts of the reaction product of maleic anhydride and castor oil or 1.3-butylene glycol and of 70 parts of alkyl cellulose. In some cases it may even be advantageous to add to this mixture a solvent, a softening agent, a bleaching agent, a dyestuff, a pigment or the like. Sometimes it is advisable previously to treat the surfaces of the glass which are to be united with a suitable adhesive, such as polyvinyl acetate or gelatin before the intermediate layer is applied.

The condensation products may be used either alone or mixed with each other for the manufacture of safety glass or they may be used in combination with other condensable or polymerizable or condensed or polymerized substances.

The products obtainable by the new process are distinguished by a considerably reduced tendency to splinter while their other properties are not unfavorably influenced. For instance, in the case of safety glass, the transparency, is by no means diminished.

The following examples serve to illustrate the invention, but they are not intended to limit it thereto, the parts being by weight:

(1) The reaction product obtained by heating 1 mol. of castor oil and 1 mol. of maleic anhydride is spread, while still warm to form a layer, upon a moderately heated glass plate and a second glass plate likewise moderately heated is superposed on the layer. The adhesion can be improved by the application of heat and pressure. The adhesive applied in this example may be mixed with that named in the following example and then be used.

(2) The reaction product obtainable by heating 1 mol. of butylene glycol and 1 mol. of maleic anhydride is dissolved in acetone. Glass wool is impregnated with this solution, then well centrifuged, pressed into the form of a felt and heated until the solvent has completely evaporated. There is thus obtained a highly effective felt-like insulating material which has considerably less tendency to splinter than glass wool has.

(3) A mixture is prepared from 30 parts of the reaction product from maleic anhydride and castor oil, 70 parts of ethyl cellulose and 60 parts of acetone. Two glass plates may be united by means of this mixture to which a bleaching agent, a dyestuff, a pigment or the like may be added. By the addition of an inorganic filling agent to this mixture, artificial materials of various kinds can be made therefrom.

(4) 30 parts of the reaction product from maleic anhydride and 1.3-butylene glycol are mixed with 60 parts of acetyl cellulose and 80 parts of acetone. The mixture is applied as described in Example 3.

(5) 30 parts of the reaction product from maleic anhydride and castor oil are mixed with 65 parts of nitrocellulose and 85 parts of acetone. The homogeneous mixture can be used as described in Example 3.

(6) 148 parts of phthalic anhydride and 90 parts of 1.3-butylene glycol are heated together at 180° C., while stirring, until a test sample, when cooled, solidifies to a viscous, gummy mass. The product is spread in a warm condition upon a moderately heated glass plate, a second sheet of glass is superposed and the combined sheet is pressed together, while taking care that no air bubbles remain in the layer.

The safety glass thus produced does not splinter when exposed to pressure and shocks.

(7) 90 parts of 1.3-butylene glycol and 134.5 parts of diglycollic acid are heated together at 180° C. until all the water formed has been distilled. This mixture is then interposed between two glass plates, as described in Example 6.

(8) 100 parts of succinic anhydride and 124 parts of glycol are heated together, the water formed being distilled until a test sample of the heated mass, when cooled, is an elastic clear substance. The product is interposed between two glass plates, as described in Example 6.

The following claims refer to the use of condensation products of maleic acid on the one hand and 1.3-glycols on the other hand, and it is to be understood that the use of maleic anhydride instead of maleic acid and the use of the corresponding 2.3 unsaturated alcohols instead of 1.3-glycols is intended to fall within the scope of the claims.

We claim:

1. As a new article of manufacture a non-splintering glass containing as binding agent for directly uniting the sheets of glass a condensation product of maleic anhydride and 1.3-butylene glycol.

2. As a new article of manufacture a non-splintering glass containing as binding agent for directly uniting the sheets of glass a condensation product of maleic anhydride and 1.3-butylene glycol under addition of acetyl cellulose.

3. Splinterless glass containing as binding agent for securing adhesion of the sheets of glass a condensation product of maleic acid and 1.3 glycols.

4. Splinterless glass containing as binding agent for securing adhesion of the sheets of glass a condensation product of a maleic acid and 1.3 glycols under addition of a polyvinyl compound.

5. Splinterless glass containing as binding agent for securing adhesion of the sheets of glass a condensation product of maleic acid and 1.3 glycols under addition of a cellulose derivative.

KARL DAIMLER.
GERHARD BALLE.